Nov. 10, 1959 M. A. MULLER ET AL 2,911,840
TANK TRACK PIN BEARING SEAL
Filed June 7, 1955 2 Sheets-Sheet 2

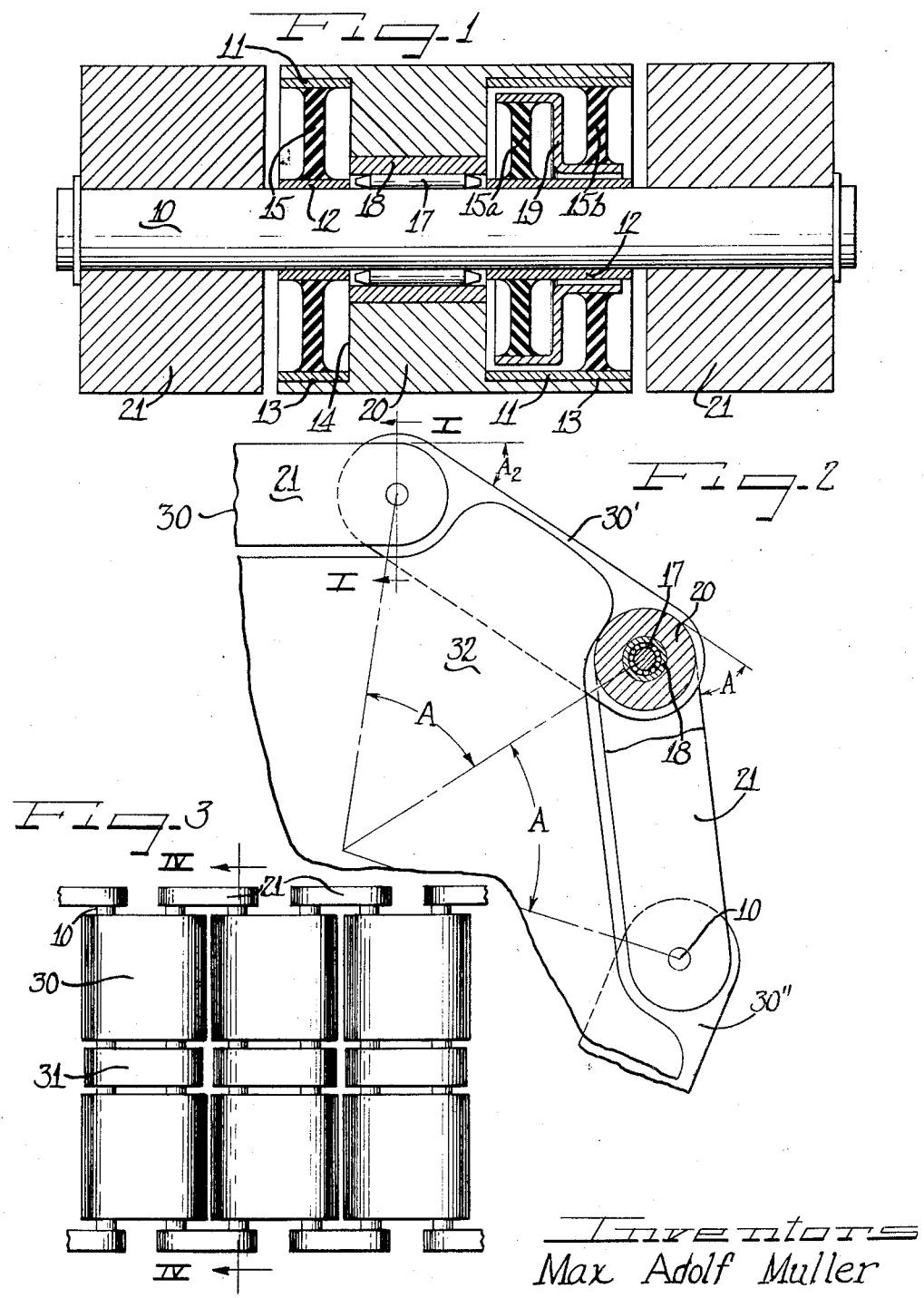

Inventors
Max Adolf Muller
Paul Vossieck
Attys

United States Patent Office 2,911,840
Patented Nov. 10, 1959

2,911,840

TANK TRACK PIN BEARING SEAL

Max Adolf Muller, Koln, and Paul Vossieck, Wermelskirchen, Germany, assignors, by mesne assignments, to Rand-Goetze Corporation, Cleveland, Ohio, a corporation of Ohio Application June 7, 1955, Serial No. 513,884

1 Claim. (Cl. 74—256)

This invention relates to a resilient seal for bearings and specially of the type used in chains and conveyors. More specifically, this invention relates to a prestressed thin rubber web seal spanning the gap between telescoped metal sleeves or rings and bonded thereto to seal the bearings of a sprocket chain, a tank tread, or the like, wherein stresses in the web are relieved and reversed during operation of the chain or tread without wrinkling the web.

It has been found that torsional loading and unloading of rubber webs causes the formation of wrinkles which soon develop into cracks and tears. Wrinkling is avoided in the web seals of this invention by pre-loading or pre-stressing the web to impose therein a relative torsional displacement, in an opposite direction to its torsional displacement during normal operation and in an amount equal to substantially one half the maximum anticipated operational displacement. By installing the seal under this pre-loaded condition the flexible web portion of the seal is never subjected to an angular displacement exceeding one half of the total relative angular displacement. The useful life of the seal is thus extended appreciably.

In one preferred embodiment of the invention, the rubber web section is plane-surfaced and extends radially between a pair of concentric sleeve rings to which it is centrally bonded. In this form, the seal may be installed where end clearances are small and where a wider seal would interfere with other adjacent members.

In a modification of the present invention, the resilient web section of the seal is of a conical shape and the metal sleeve rings are positioned in staggered relation to each other. Use of the conical configuration for the resilient web portion of the seal permits a greater relative angular displacement between the sleeve rings for a given enclosed web area, with a corresponding reduction of internal torsional stresses and wrinkle formation.

In another preferred embodiment of the invention, the rubber web section of the seal is separated into two or more smaller webs, and bonded to an interconnecting flanged disk in such a manner as to permit equal distribution of the total relative angular displacement of the seal through the successive multiple web sections, thereby permitting substantially greater relative angular displacements for a given seal diameter. This embodiment of the invention has a particular application where a small diameter seal is required and relatively large angular displacements are expected.

It is then an object of the present invention to provide a pre-stressed web seal which is stress relieved in operation thereby preventing web wrinkling and increasing the wear life of the seal.

Another object of the present invention is to provide a torsionally stressed rubber web, bonded between metal rings, to provide a hermetic seal which will deform within certain limits of relative angular displacement without developing objectionable internal stresses and wrinkles.

Yet another object of the present invention is to provide a resilient seal comprised of a rubber web between two concentric sleeve rings, which seal is preloaded by imposing a predetermined relative angular displacement on the rubber web, opposite to the relative operating angular displacement, and equal to one half the total amount of such displacement, thereby minimizing wrinkling and internal torsional stresses of the web.

Many other objects, advantages and additional features of the present invention will become manifest to those versed in the art upon making reference to the detailed description which follows and in the preferred structural embodiments which are described therein.

On the drawings:

Figure 1 is a transverse sectional view taken along the line I—I of Figure 2 with parts in elevation of a roller chain having the rollers sealed with seals according to the invention.

Figure 2 is a fragmentary side elevation view of the chain of Figure 1 showing the angular displacement of the seals as the chain travels around its sprocket.

Figure 3 is a fragmentary plan view of a portion of a tank tread having conical web seals according to a modified form of my invention.

As shown on the drawings:

Figure 4:
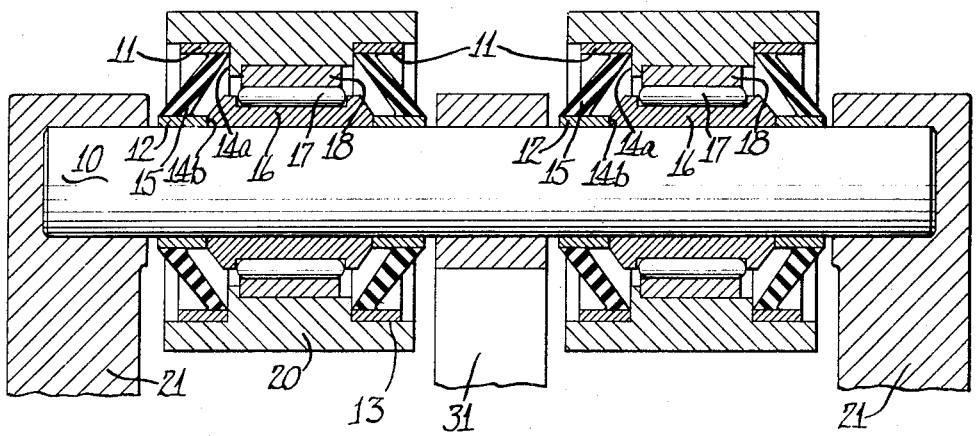
Figure 4 is a transverse cross sectional view with parts in elevation taken along the lines IV—IV of Figure 3.

In the form of the invention illustrated in Figure 1, the link members 21 are rigidly connected with the link pin 10, while the bearing housing 20 is rotatably mounted on the shaft through the intermediate needle bearings 17. The needle bearings 17 are retained in their position by a sleeve member 18 of suitable bearing material. A seal is press-fitted into a recess 13 at each end of the bearing housing 20, by rigidly mounting the sleeve ring 12 on the link pin shaft 10 and press-fitting the outer sleeve ring 11 into recess 13 until it seats on the shoulder 14. A rubber washer 15 in the preferred embodiment, and a series of washers 15a and 15b in the alternative construction, are vulcanized between the inner sleeve ring 12 and outer sleeve ring 11 thereby providing a yieldable resilient connection between the link and link pins.

The preferred embodiment of the seal in Figure 1 shows a single web construction for the connecting rubber washer 15. Use of this type of construction permits a relatively thin seal assembly, which correspondingly allows greater bearing areas for a given link assembly. In addition, the plane-surfaced single web configuration will find application where only comparatively small radii of curvature will be imposed on the track during its travel.

Also shown in Figure 1 is a modification of the seal wherein a multiple web type of construction is used rather than a single plane-surfaced rubber washer. In this construction, the inter-connecting web portion of the seal is divided into two smaller plane-surfaced sections, 15a and 15b. The central area of the web sections 15a is bonded to the sleeve ring 12, while the outer periphery of the web is bonded to one of the alternating flanged portions of a hard-material ring 19. The web 15b is bonded to the outer sleeve ring 11 and is connected at its inner diameter to the other alternate flanged portion of the ring 19. The torque generated by the relative movement between the link pin 10 and bearing housing 20 is transmitted from the inner sleeve ring 12 and outer sleeve ring 11 to the rubber washer elements 15a and 15b, equally, through the intermediary of the hard-material flanged ring 19. It is then apparent that in this case, the total induced torque will be equally distributed between the two web elements 15a and 15b, thereby halving the torsional stress on each individual element and permitting proportionately greater amounts of relative angular rotation between the link pin 10 and bearing housing 20.

In addition, the multiple web modification of the seal as shown in Figure 1 makes possible a hermetic seal for chains where the radii of curvature of adjacent links is relatively small, and where comparatively thin seal diameters are required.

In Figure 2, a series of links 30, are connected by link pins 10 and are shown engaging the sprocket 32. Link pins 10 each contain four units of the seal assembly and needle bearings 17. Link 30 is just entering engagement with the sprocket 32, while link 30' is in partial engagement with the sprocket such that the relative angle between links 30 and 30' is equal to one-half the largest amount of angular displacement any two adjacent links will be rotated through, as indicated by angle A between links 30' and 30'', when both links are positively engaged with the sprocket 32. It is at this relative half-angle position that the seal assemblies are installed in a track link and pin assembly so that the greatest amount of angular displacement imposed on the seal in either direction, whether in the straightened position of the chain, or on the drum at the smallest radii of curvature, will never exceed the half-angle amount. Installation at the half-angle position also results in a pre-loaded condition of the resilient portion of the seal, when the chain is in a straightened position.

As an alternate method of installation, the seal assemblies may be installed in a link and link pin when the chain is in the straightened position by imposing an initial angular displacement on the resilient portion of the seal equal and opposite in amount to the relative angular displacement that the seal will be subjected to when it is at the half-angle position in engaging the sprocket 32. Either of the above mentioned methods of installation may be used or any other method which limits the maximum torsional deformation of the resilient portion of the seal to half the total relative angular displacement of the track chain at its smallest radius of curvature.

Figure 3 is a fragmentary plan view of the chain showing the links 30 connected to the link pins 10 with the central spacing guide link 31 and the end connectors 21.

Figure 6:
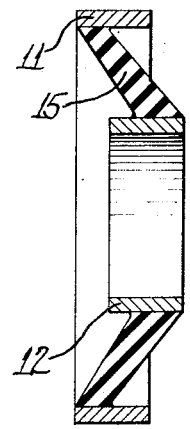
Figure 6 is an enlarged transverse cross-sectional view taken substantially along the line VI—VI of Figure 5.

In an alternate modification of the invention as shown in Figures 4 and 6 parts identical with parts in the preferred embodiment of the seal have been marked with the same reference numerals. As therein shown, a needle bearing race sleeve 16 is press-fitted on the link pin shaft 10, forming a track for the needle bearings 17. A retaining sleeve 18, is press-fitted into the bearing housing 20. A recess 13 is provided at each end of the bearing housing 20 to rigidly accommodate the outer sleeve ring 11 of the seal assembly when seated on the shoulder 14a. The inner sleeve ring 12 of the seal is rigidly mounted on the link pin 10 until it seats on the shoulder 14b of the needle bearing sleeve wall 16.

A resilient interconnecting web section 15 is vulcanized between the outer sleeve ring 11 and inner sleeve ring 12. In Figure 4, the web section of the seal is of a truncated conical shape. This particular configuration provides a larger surface area over that of a plane surfaced web section, thereby allowing a greater distribution of the generated torsional sheer stresses induced by the relative movement between the link pin 10 and bearing assembly 20, with a corresponding reduction in stress at any point in the web, and a greater total relative angular displacement before excessive stresses and wrinkling develops.

Referring again to Figure 2, when the link and link pin are in the position shown so that their relative angle is only equal to half of that at the smallest radius of curvature, the inner sleeve ring 12 and outer sleeve ring 11 may each be inserted in their respective operating positions without imposing any initial relative angular displacement, so that when the chain advances to the smallest radius of curvature position, an additional relative half-angle displacement will be imposed on the web, and when the chain is in the straightened position, the web will have passed through the neutral position and then be subjected to an opposite relative angular displacement equal in amount to the half-angle stress when the chain is on the drum. It is this selective method of installation of the seal in the link and link pin so as to limit the torsional stresses on the resilient web portion of the seal to the half-angle amount that result in a greatly extended life of the resilient web portion of the seal during operation.

Figure 5:
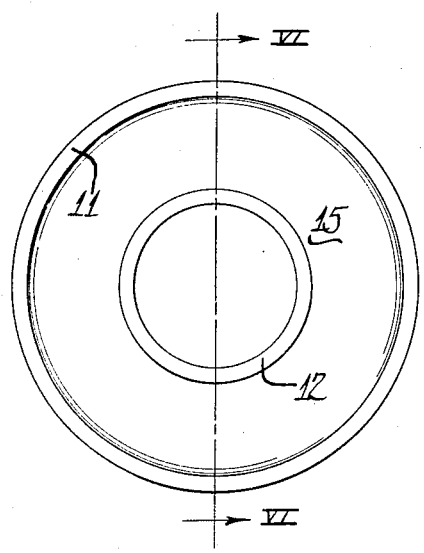
Figure 5 is an enlarged elevational view of a seal as utilized in the tank tread assembly of Figures 3 and 4.

Figure 5 shows the concentric spaced relationship of the inner sleeve ring 12 and outer sleeve ring 13 and the enclosing web 15.

Figure 6 shows an enlarged seal assembly according to the modified form of the invention of Figure 4. It will be noted that the conical web section 15 has a slight radial taper from the inner sleeve ring 12 to the outer sleeve ring 11. This taper permits a substantial equalization of bonding areas between the inner and outer sleeve rings, with a corresponding equalization and uniform distribution of the induced torsional sheer stresses throughout the web during operation. The convex face of the web may be inclined to the horizontal by some suitable angle, preferably 50°, and the concave face of the web may be inclined inwardly from the vertical some other suitable angle preferably 35°, to impart the radial taper to the web section.

Having described a preferred form of the invention and certain modifications thereof, it will be apparent that various other changes in the construction and arrangement of the seal may be made by persons skilled in the art without departing from the spirit and scope of the invention. Consequently, it should be understood that we wish to embody within the scope of the patent warranted hereon all such modifications as reasonable and properly come within the scope of our contribution to the art.

We claim as our invention:

In an endless sprocket chain, a series of links pivotally connected by link pins, a bearing operatively positioned between one of said links and its associated link pin, and sealing means comprising inner sleeve ring means secured to said pin, outer sleeve ring means concentric with and radially outside said inner ring means and secured to said link, a pair of independent frusto-conical resilient webs spaced axially on opposite sides of said bearing, each web bonded to said inner and outer ring means, the apex ends of said webs extending in axially opposite directions, whereby said webs seal dirt away from the bearing between them while permitting relative oscillation between said link and said link pin and said webs resist relative movement of said pin and said link axially of said pin, said webs being torsionally preloaded when the connected links are in a substantially coplanar position, said preloading being in a direction opposite to the direction of relative displacement of said connected links when passing around a sprocket and in an amount equal to one-half the total relative angular displacement between said sleeve ring means during movement of said chain about said sprocket.

References Cited in the file of this patent

UNITED STATES PATENTS

| | | |
|---|---|---|
| 2,061,223 | Cunningham et al. | Nov. 17, 1936 |
| 2,395,963 | Fergusson | Mar. 5, 1946 |
| 2,517,429 | Henning | Aug. 1, 1950 |

FOREIGN PATENTS

| | | |
|---|---|---|
| 360,168 | Great Britain | Nov. 5, 1931 |
| 459,104 | Great Britain | Jan. 1, 1937 |
| 478,101 | Great Britain | Jan. 12, 1938 |
| 621,355 | Great Britain | Apr. 7, 1949 |
| 1,012,847 | France | Apr. 23, 1952 |